(12) United States Patent
Howarth et al.

(10) Patent No.: US 7,336,175 B2
(45) Date of Patent: *Feb. 26, 2008

(54) METHODS AND DEVICES FOR LOCATING AND UNIQUELY PROVISIONING RFID DEVICES

(75) Inventors: Arthur G. Howarth, San Jose, CA (US); Ralph Droms, Boxborough, MA (US); Roland Saville, Boca Raton, FL (US); Lawrence Kreeger, Fremont, CA (US); Christopher Wiborg, Mountain View, CA (US); Vikas Butaney, Milpitas, CA (US); Rajiv Singhal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/866,507

(22) Filed: Jun. 9, 2004

(65) Prior Publication Data

US 2005/0252957 A1 Nov. 17, 2005

Related U.S. Application Data

(60) Provisional application No. 60/570,999, filed on May 13, 2004.

(51) Int. Cl.
*G08B 13/14* (2006.01)

(52) U.S. Cl. .................. 340/572.1; 340/10.1; 705/36

(58) Field of Classification Search ............ 340/572.1, 340/539.1, 5.91, 10.3, 10.1, 825.49; 235/435, 235/451; 705/36
See application file for complete search history.

(56) References Cited

U.S. PATENT DOCUMENTS 4,688,026 A 8/1987 Schribner et al. ............ 235/385
5,339,073 A 8/1994 Dodd et al.
5,646,616 A 7/1997 Komatsu ................... 340/988
5,850,187 A 12/1998 Carrender et al.
5,887,176 A 3/1999 Griffith et al.
6,111,517 A 8/2000 Atick et al. ................ 340/5.83
6,115,079 A 9/2000 McRae ..................... 348/731
6,300,903 B1 10/2001 Richards et al. ............ 342/450
6,539,281 B2 3/2003 Wan et al. .................. 700/236
6,553,489 B1 4/2003 Osler et al.
6,963,282 B1 11/2005 Yeates et al. ............ 340/572.4
7,057,511 B2 6/2006 Shanks et al. ........... 340/572.1
7,064,660 B2 6/2006 Perkins et al. ......... 340/539.13
7,075,412 B1 * 7/2006 Reynolds et al. .......... 340/10.2

(Continued)

OTHER PUBLICATIONS

International Search Report dated Oct. 13, 2005, from corresponding International Application No. PCT/US05/16484, 6 pp. including Notification of Transmittal.
Written Opinion of the International Searching Authority dated Oct. 13, 2005, from corresponding International Application No. PCT/US05/16484, 5 pp.

(Continued)

*Primary Examiner*—Phung T. Nguyen
(74) *Attorney, Agent, or Firm*—Beyer Weaver LLP

(57) ABSTRACT

Methods and devices are provided for identifying, locating and provisioning individual RFID devices in a network. According to some implementations of the invention, a combination of EPC code information and existing networking standards form the basis of identifying and provisioning methods. For example, MAC address information and EPC information can be combined to identify a particular device and its location in a network. For implementations using the Dynamic Host Configuration Protocol ("DHCP"), DHCP Options may be used to pass provisioning information. Some implementations employ Domain Name Service ("DNS") and dynamic DNS ("DDNS") to allow easy identification of RFID devices.

55 Claims, 9 Drawing Sheets

U.S. PATENT DOCUMENTS

| | | |
|---|---|---|
| 7,081,819 B2 | 7/2006 | Martinez de Velasco Cortina et al. ............... 340/572.7 |
| 7,103,886 B2 | 9/2006 | Haller et al. ............... 718/100 |
| 7,129,837 B2 | 10/2006 | Shannon et al. ......... 340/539.13 |
| 7,205,897 B2 | 4/2007 | Lin ............... 340/572.1 |
| 2001/0028308 A1 | 10/2001 | De La Huerga ......... 340/573.1 |
| 2002/0016739 A1 | 2/2002 | Ogasawara ............... 705/22 |
| 2002/0161907 A1 | 10/2002 | Moon ............... 709/230 |
| 2004/0021569 A1 | 2/2004 | Lepkofker et al. ......... 340/568.1 |
| 2004/0061646 A1 | 4/2004 | Andrews et al. ............ 342/463 |
| 2004/0069852 A1* | 4/2004 | Seppinen et al. ............ 235/451 |
| 2004/0100383 A1 | 5/2004 | Chen et al. ............... 340/572.1 |
| 2004/0108795 A1 | 6/2004 | Meek et al. ............... 312/218 |
| 2004/0128389 A1 | 7/2004 | Kopchik ............... 709/228 |
| 2004/0257202 A1 | 12/2004 | Coughlin et al. ............ 340/5.82 |
| 2005/0021626 A1 | 1/2005 | Prajapat et al. ............ 709/205 |
| 2005/0093679 A1 | 5/2005 | Zai et al. ............... 340/10.2 |
| 2005/0099270 A1* | 5/2005 | Diorio et al. ............ 340/10.51 |
| 2005/0199716 A1* | 9/2005 | Shafer et al. ............... 235/385 |
| 2005/0209947 A1* | 9/2005 | Shafer ............... 705/36 |
| 2005/0252957 A1* | 11/2005 | Howarth et al. ............ 235/375 |
| 2005/0252970 A1 | 11/2005 | Howarth et al. ............ 235/451 |
| 2005/0252971 A1 | 11/2005 | Howarth et al. ............ 235/451 |
| 2005/0253717 A1* | 11/2005 | Howarth et al. ......... 340/572.1 |
| 2005/0253718 A1 | 11/2005 | Droms et al. ............ 340/572.1 |
| 2005/0253722 A1 | 11/2005 | Droms et al. ............ 340/572.1 |
| 2005/0264420 A1 | 12/2005 | Vogel et al. ............ 340/572.1 |
| 2006/0005035 A1 | 1/2006 | Coughlin ............... 713/182 |
| 2006/0010086 A1 | 1/2006 | Klein ............... 705/410 |
| 2006/0033606 A1 | 2/2006 | Howarth et al. ............ 340/10.1 |
| 2006/0044111 A1* | 3/2006 | Kollar et al. ............... 340/10.1 |
| 2006/0091999 A1 | 5/2006 | Howarth ............... 340/10.3 |
| 2006/0253590 A1 | 11/2006 | Nagy et al. ............... 709/226 |
| 2006/0266832 A1 | 11/2006 | Howarth et al. ............ 235/451 |
| 2007/0013518 A1 | 1/2007 | Howarth ............... 340/572.1 |
| 2007/0027966 A1 | 2/2007 | Singhal et al. ............... 709/220 |
| 2007/0080784 A1 | 4/2007 | Kim et al. ............... 340/10.1 |

OTHER PUBLICATIONS

H. Schulzrinne, Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

J. Polk et al., Dynamic Host Configuration Protocol Option for Coordinate-based Location Configuration Information, RFC 3825, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.

WhereNet, Products, http://wherenet.com/products_main.html, printed Apr. 16, 2005, 2 pages.

*EPCTM Tag Data Standards Version 1.1 Rev. 1.24*, EPCglobal, Standard Specification, Apr. 1 2004, 78 pages.

*Global Location Number(GLN) Implementation Guide*, Uniform Code Council, Inc., May 2002, 13 pages.

International Search Report dated Feb. 17, 2006, from related International Application No. PCT/US05/15322, 5 pp. including Notification of Transmittal.

Written Opinion of the International Searching Authority dated Feb. 17, 2006, from related International Application No. PCT/US05/15322, 3 pp.

Lonvick, C., The BSD Syslog Protocol, RFC 3164, Aug. 2001, 28 pages.

Johnston, M., DHCP Preboot Execution Environment (PXE) Options draft-ietf-dhc-pxe-options-01.txt, Internet-Draft, Jan. 21, 2005, 7 pages.

Johnson, R., *TFTP Server Address DHCP Option draft-raj-dhc-tftp-addr-option-00.txt*, Internet-Draft, Feb. 6, 2005, 7 pages.

Littlefield, J., *Vendor-Identifying Vendor Options for Dynamic Host Configuration Protocol version 4 ( DPHCPv4 )*, RFC 3925, Oct. 2004, 9 pages.

Simple Network Management Protocol, Internetworking Technologies Handbook, Chapter-56, printed Jul. 14, 2005, 12 pages.

Harrington, D., et al, An Architecture for DescribingSimple Network Management Protocol (SNMP) Management Frameworks, RFC 3411, Dec. 2002, 64 pages.

Presuhn, R., Editor, Version 2 of the Protocol Operations for the Simple Network Management Protocol (SNMP), RFC 3416, Dec. 2002, 31 pages.

The Global Language of Business, retrieved from the internet: http://www.ean-int.org/locations.html, [retrieved Mar. 24, 2005], 5 pages.

"*Cisco Application-Oriented Networking: A Network-Based Intelligent Message Routing System*", http://www.cisco.com/en/US/products/ps6438/products_data_sheet0900aecd802c1f9c.html Data Sheet, Cisco Systems, Inc., Jul. 13, 2005, pp. 1-7.

"*Cisco Catalyst 6500 Series Application-Oriented Networking Module*", http://www.cisco.com/en/US/products/ps6438/products_data_sheet0900aecd802c1fe9.html Data Sheet, Cisco Systems, Inc. Jul. 13, 2005, pp. 1-3.

"*Cisco Application-Oriented Networking—A Network Embedded Intelligent Message Routing System*", http://www.cisco.com/en/US/products/ps6438/prod_bulletin0900aecd802c201b.html Product Bulletin No. 2886, Cisco Systems, Inc. Jul. 13, 2005, pp. 1-3.

"*Cisco Catalyst 6500 Series Application-Oriented Networking Module: Large Photo*", Photo, Retrieved from the internet: http://www.cisco.com/en/US/products/ps6448/prod_view_selector.html [Retrieved Jul. 13, 2005], Cisco Systems, Inc. 1 page.

"*The EPCglobal Architecture Framework*" EPCglobal Final Version of Jul. 1, 2005, pp. 1-53.

Girardot, Marc and Sundaresan, Neel, "*Millau: an encoding format for efficient representation and exchange of XML over the web*" [Retrieved Jan. 31, 2005]. Retrieved from the internet: http:www9.org/w9cdrom/154/154.html 25 pages.

Fujitsu Limited, et al., "*Web Services Reliability (WS-Reliability)* Ver1.0 ", Jan. 8, 2003. pp. 1-45.

Biloruset, Ruslan et al., "*Web Services Reliable Messaging Protocol (WS-ReliableMessaging)*", Mar. 2004, pp. 1-40.

Mockapetris, P., "*Domain Names—Concepts and Facilities*", RFC 1034, Nov. 1987, 43 pages.

Mockapetris, P., "*Domain Names—Implementation and Specification*", RFC 1035, 55 pages, Nov. 1987.

International Search Report dated Jul. 13, 2006, from (related) International Application No. PCT/US05/16319, 5 pp. including Notification of Transmittal.

Written Opinion of the International Searching Authority dated Jul. 13, 2006, from (related) International Application No. PCT/US05/16319, 5 pp.

US Office Action mailed Oct. 6, 2006 from (related) U.S. Appl. No. 10/866,506.

US Office Action mailed Oct. 6, 2006 from (related) U.S. Appl. No. 10/866,285.

US Office Action mailed Nov. 13, 2006 from (related)U.S. Appl. No. 11/073,245, 12 pp.

U.S. Office Action mailed Jun. 26, 2007 from U.S. Appl. No. 11/195,160.

R. Droms, *Dynamic Host Configuration Protocol*, RFC 2131, Mar. 1997, 43 pages.

S. Alexander et al., *DHCP Options and BOOTP Vendor Extensions*, RFC 2132, Mar. 1997, 32 pages.

G. Stump et al., The User Class Option for DHCP, RFC 3004, Nov. 2000, 6 pages.

Y. T'Joens, *DHCP Reconfigure Extension*, RFC 3203, Dec. 2001, 6 pages.

M. Patrick, *DHCP Relay Agent Information Option*, RFC 3046, Jan. 2001, 14 pages.

EPCg1, *Frequently Asked Questions*, http://www.epcglobalinc.com/about/faqs.html, printed Mar. 24, 2005, 9 pages.

US Office Action mailed Mar. 22, 2007 from (related) U.S. Appl. No. 10/866,506.

US Office Action mailed Apr. 4, 2007 from (related) U.S. Appl. No. 10/866,285.

US Office Action mailed Jun. 18, 2007 from (related) U.S. Appl. No. 11/010,089.

\* cited by examiner

METHODS AND DEVICES FOR LOCATING AND UNIQUELY PROVISIONING RFID DEVICES

CROSS-REFERENCES TO RELATED APPLICATIONS

This application claims priority to U.S. Provisional Patent Application No. 60/570,999, entitled "Methods and Devices for Uniquely Provisioning RFID Devices" and filed on May 13, 2004, which is hereby incorporated by reference for all purposes. This application is related to U.S. patent application Ser. No. 10/866,506, entitled "Methods and Devices for Uniquely Provisioning RFID Devices" and filed on Jun. 9, 2004, and is also related to U.S. patent application Ser. No. 10/866,285, entitled "Methods and Devices for Assigning RFID Device Personality" and filed on Jun. 9, 2004, both of which are hereby incorporated by reference for all purposes.

BACKGROUND OF THE INVENTION

1. Field of the Invention

The present invention relates to radio frequency identification ("RFID") technology. More particularly, the present invention relates to provisioning uniquely RFID devices in a network.

2. Description of the Related Art

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes variable length bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use: a passive button tag costs approximately $1 and a battery-powered read/write tag may cost $100 or more.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags beyond approximately one centimeter.

In part because of the significant efforts that have been expended in solving the foregoing problems, prior art systems and methods for networking RFID devices are rather primitive. RFID devices have only recently been deployed with network interfaces. Device provisioning for prior art RFID devices is not automatic, but instead requires a time-consuming process for configuring each individual device. Prior art RFID devices and systems are not suitable for large-scale deployment of networks of RFID devices.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

Moreover, many RFID devices are deployed in a hostile industrial environment (such as a warehouse or factory) by relatively unskilled "IT" personnel. If a device deployed in one location fails, for example, it may simply be removed and replaced by a functioning device that was deployed in another location. Therefore, it would be desirable to provide methods and devices for uniquely and individually identifying RFID devices and their precise location in a network.

Moreover, RFID devices are being deployed with "static" knowledge of where the device was deployed at the original time of deployment. In practice, RFID devices are moved if another device is damaged or not functioning. In general, it is desirable to allow for the movement of RFID devices. However, if an RFID device is moved, prior art systems do not know to what location the RFID device has been moved.

It would also be desirable to provision such RFID devices automatically for their expected use. RFID devices perform different functions and may interface to the upstream systems differently depending on where they are located. The functions they perform, as well as the unique settings to perform those functions, will be referred to herein as the device "personality." It would be desirable not only to identify an RFID device and to determine its location, but also to provision, configure and deploy software and firmware to allow the RFID device to perform various functions and roles based on location. As used herein, "provisioning" a device can include, but is not limited to, providing network configuration, providing personality configuration, incorporating the device into a network database and enabling the device with software (e.g., business process software). It would also be desirable to provide for convenient reprovisioning and personality updates of RFID devices.

SUMMARY OF THE INVENTION

Methods and devices are provided for identifying and provisioning individual RFID devices in a network. According to some implementations of the invention, a combination of EPC code information and existing networking standards form the basis of identifying and provisioning methods. For example, MAC address information and EPC information can be combined to identify a particular device and its location in a network. Upper-level applications can be notified, for example, that a particular RFID device is available for use.

For implementations using the Dynamic Host Configuration Protocol ("DHCP"), DHCP Options may be used to pass identification, location and provisioning information. For example, selected DHCP Options may be used to indicate whether a device is an RFID device, to provide an EPC code uniquely identifying the particular device, indicating the company name using the device and indicating how the device is being used.

Some such implementations of the invention use DHCPREQUEST and DHCPINFORM (RFC 2131) and DHCP Options (RFCs 2132 and 3004) to pass current provisioning and personality information. Moreover, some such implementations of the invention use the DHCP-FORCERENEW command (RFC 3203) from a DHCP server to initiate an update or to complete reconfiguration, as required.

In order to secure the DHCPFORCERENEW command, some implementations provide for a cached secret to be hashed with a client EPC that is included with the DHCPREQUEST from the RFID device and the response from the DHCP server. Some implementations employ Domain Name Service ("DNS") and dynamic DNS ("DDNS") to allow easy identification of RFID devices.

Some aspects of the invention provide a method for uniquely provisioning a radio frequency identification ("RFID") device. The method includes the following steps: receiving a provisioning request on a network; automatically identifying an RFID device according to a media access control ("MAC") address and an electronic product code ("EPC") included in the provisioning request; and automatically locating the RFID device according to location information included in the provisioning request. The method may be performed by a network device such as a Dynamic Host Configuration Protocol ("DHCP") server.

The method may include the step of comparing information in the provisioning request with other information, in order to validate the RFID device. The method may also include the steps of determining whether the RFID device has previously booted and/or of determining whether provisioning information has previously been established for the RFID device.

The RFID device may be provisioned when it is determined that provisioning information has previously been established for the RFID device. The RFID device may be categorized as an untrusted device if it is determined that provisioning information has not previously been established for the RFID device.

Alternative aspects of the invention provide another method for uniquely provisioning an RFID device. The method includes the following steps: forming a DHCPDISCOVER request that includes an EPC of an RFID device and location information indicating a location of the RFID device; sending the DHCPDISCOVER request to a DHCP server; and receiving provisioning information from the DHCP server that is specifically intended for the RFID device.

The forming step may involve including the EPC in an Option field (e.g., Option 61) of the DHCPDISCOVER request. The forming step may involve including information (e.g., in Option 60) of the DHCPDISCOVER request that indicates that the DHCPDISCOVER request comes from an RFID device. The forming step may also involve including information in the DHCPDISCOVER request that indicates a name of a company that provides, owns or operates the RFID device. Moreover, the forming step may involve including information (e.g., in Option 77) of the DHCPDISCOVER request regarding the type of RFID device that formed the DHCPDISCOVER request.

An RFID device may include the EPC during a first part of the forming step. A relay agent may include the location information in the DHCPDISCOVER request during a second part of the forming step. Alternatively, the RFID device may include the location information in the DHCPDISCOVER request.

Some embodiments of the invention provide an RFID device, including: a flash memory; a processor configured to form a DHCPDISCOVER request that includes an EPC of an RFID device in Option 61, according to instructions in the flash memory; and a network interface for sending the DHCPDISCOVER request to a DHCP server.

Other embodiments of the invention provide a computer program embodied in a machine-readable medium, the computer program including instructions for controlling one or more elements of an RFID network to perform the following steps: form a DHCPDISCOVER request that includes an EPC of an RFID device and location information indicating a location of the RFID device; send the DHCPDISCOVER request to a DHCP server; and receive provisioning information from the DHCP server that is specifically intended for the RFID device.

Still other embodiments of the invention provide a computer program embodied in a machine-readable medium, the computer program including instructions for controlling a network device to perform the following steps: receive a provisioning request on a network; identify an RFID device according to a MAC address and an EPC included in the provisioning request; and locate the RFID device according to location information included in the provisioning request.

Yet other aspects of the invention provide methods for deploying an RFID device in a network. One such method includes the following steps: forming a DHCPDISCOVER request that includes an EPC of an RFID reader and location information indicating that the RFID reader is positioned at an exit door of a retail store; sending the DHCPDISCOVER request to a DHCP server; receiving provisioning information from the DHCP server that is specifically intended for the RFID reader; and provisioning the RFID reader according to the provisioning information, thereby enabling the RFID reader to read RFID tags passing through the exit door and to transmit RFID tag information to an RFID network. The RFID tag information may include product information and/or shopper information.

The method may involve the step of using the RFID tag information to cause a financial account to be debited for the cost of the products. The RFID tag information may be used to automatically update a database maintained by the retail store and/or a database maintained by a manufacturer/ producer, wholesaler and/or a distributor of at least one of the products. The RFID tag information may be used to update a business plan, such as a marketing, manufacturing, distribution or sales plan.

Still other embodiments of the invention provide an RFID network, including: a plurality of RFID devices; a plurality of switches connecting the RFID devices to the RFID network; and a DHCP server. In some such embodiments, at least some of the RFID devices are configured to do the following: form a DHCPDISCOVER request that includes an EPC of an RFID device; send the DHCPDISCOVER request to the DHCP server via a switch; and receive provisioning information from the DHCP server that is specifically tailored for the RFID device. The switch is configured to add location information to the DHCPDISCOVER request indicating a location of the RFID device. The DHCP server is configured to receive a DHCPDISCOVER request, to automatically identify an RFID device according to a MAC address and an EPC included in the DHCPDISCOVER request and to automatically locate the RFID device according to location information included in the DHCPDISCOVER request.

DETAILED DESCRIPTION OF THE INVENTION

Figure 1:
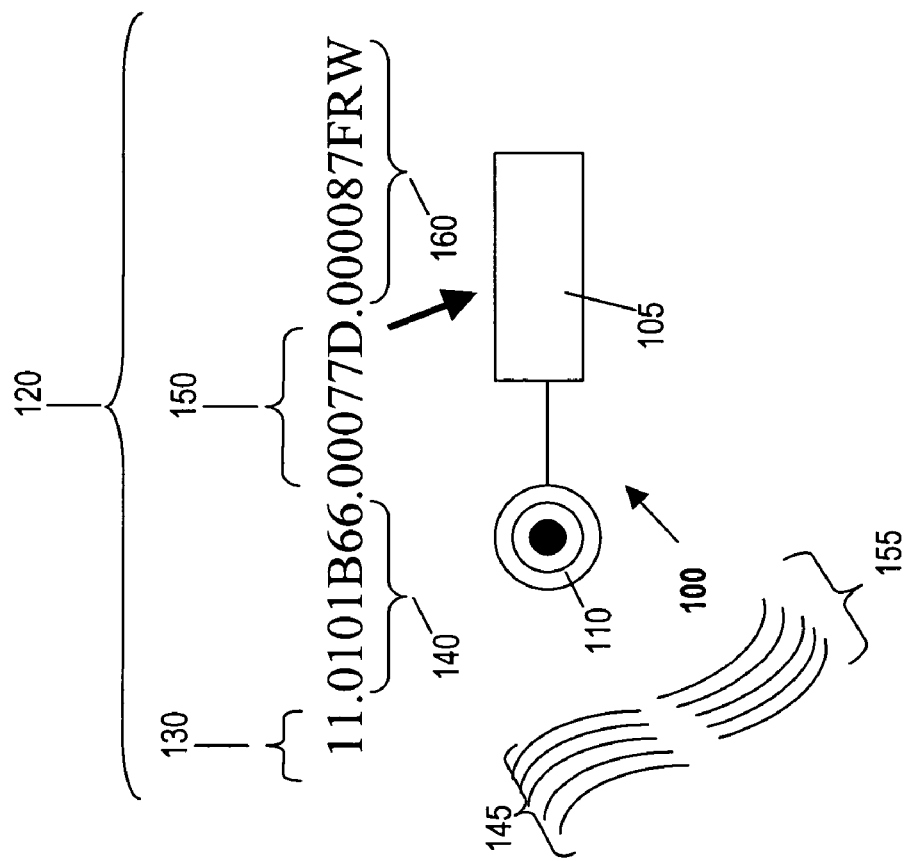
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although the present invention involves methods and devices for identifying and provisioning individual RFID devices in a network, many aspects of the present invention can be applied to identifying and provisioning other types of devices in a network. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can, for example, transport the products through a door that has an RFID reader nearby. The EPC information regarding the products can be provided to an RFID network by the reader and can be used to automatically update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 2:
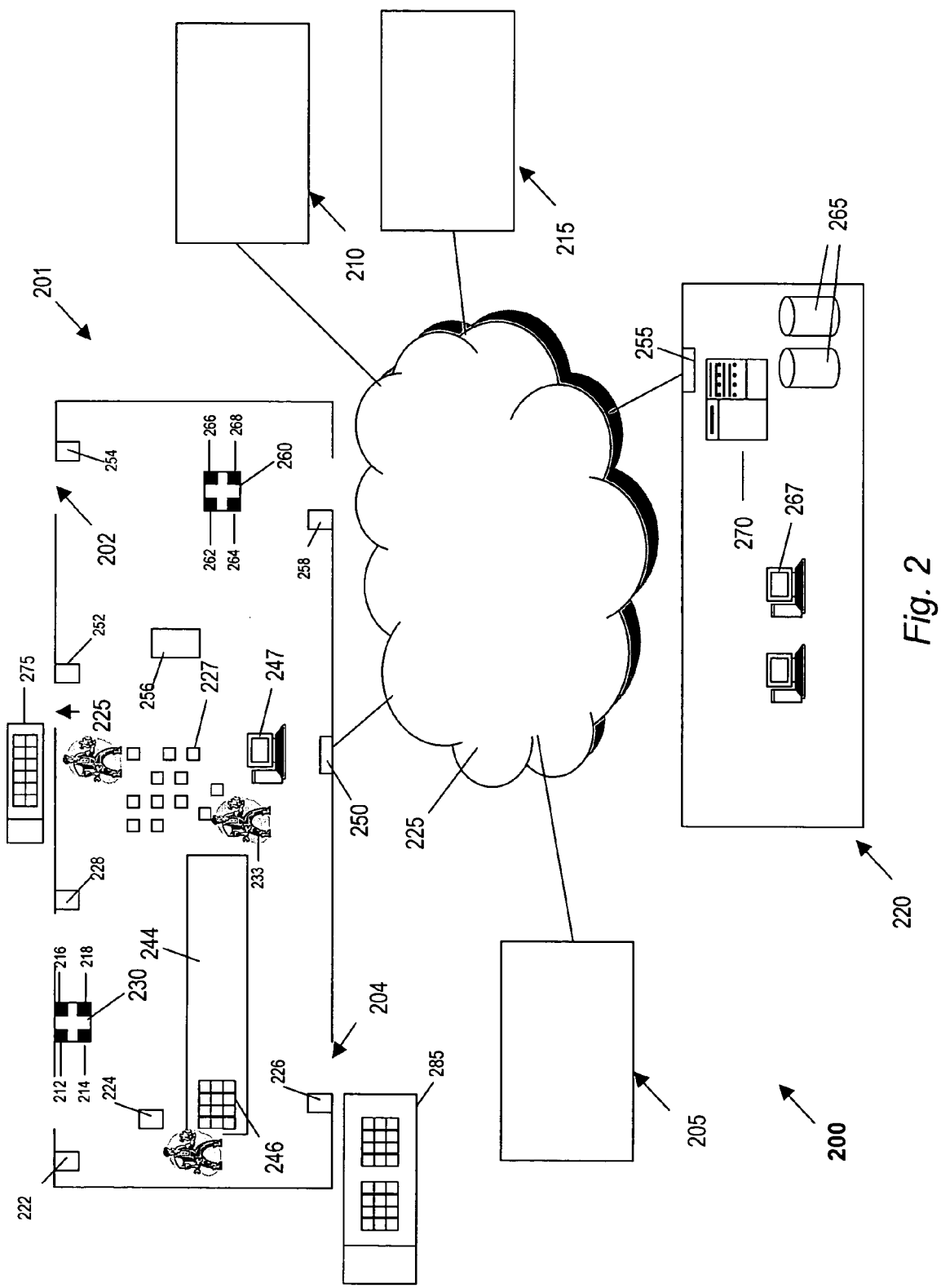
FIG. 2 illustrates an exemplary RFID network according to the present invention.

Some aspects of the invention use a combination of EPC code information and modified versions of existing networking standards for identifying, locating and provisioning RFID devices, such as RFID readers and RFID printers, that are located in a network. An example of such a network is depicted in FIG. 2. Here, RFID network 200 includes warehouse 201, factory 205, retail outlet 210, financial institution 215 and headquarters 220. As will be appreciated by those of skill in the art, network 200 could include many other elements and/or multiple instances of the elements shown in FIG. 2. For example, network 200 could include a plurality of warehouses, factories, etc.

In this illustration, products 227 are being delivered to warehouse 201 by truck 275. Products 227, which already include RFID tags, are delivered through door 225. In this example, RFID reader 252 is connected to port 262 of switch 260. Here, switches 230 and 260 are connected to the rest of RFID network 200 via gateway 250 and network 225. Network 225 could be any convenient network, but in this example network 225 is the Internet. RFID reader 252 reads each product that passes through door 225 and transmits the EPC code corresponding to each product on RFID network 200.

RFID tags may be used for different levels of a product distribution system. For example, there may be an RFID tag for a pallet of cases, an RFID tag for each case in the pallet and an RFID tag for each product. Accordingly, after products 227 enter warehouse 201, they are assembled into cases 246. RFID printer 256 makes an RFID tag for each of cases 246. In this example, RFID printer 256 is connected to port 266 of switch 260. RFID printer 256 could operate under the control of PC 247 in warehouse 201, one of PCs 267 in headquarters 220, or some other device.

RFID reader 224, which is connected to port 214, reads the EPC code of each case 246 and product 227 on conveyor belt 244 and transmits this information on network 200. Similarly, RFID reader 226, which is connected to port 216, reads the EPC code of each case 246 and product 227 that exits door 204 and transmits this information on network 200. Cases 246 are loaded onto truck 285 for distribution to another part of the product chain, e.g., to retail outlet 210.

Each of the RFID devices in network 200 preferably has a "personality" suitable for its intended use. For example, device 252 could cause reassuring tone to sound and/or a green light to flash if an authorized person or object enters door 225. However, device 252 might cause an alarm to sound and/or an alert to be sent to an administrator on network 200 if a product exits door 225 or an unauthorized person enters or exits door 225.

Figure 3:
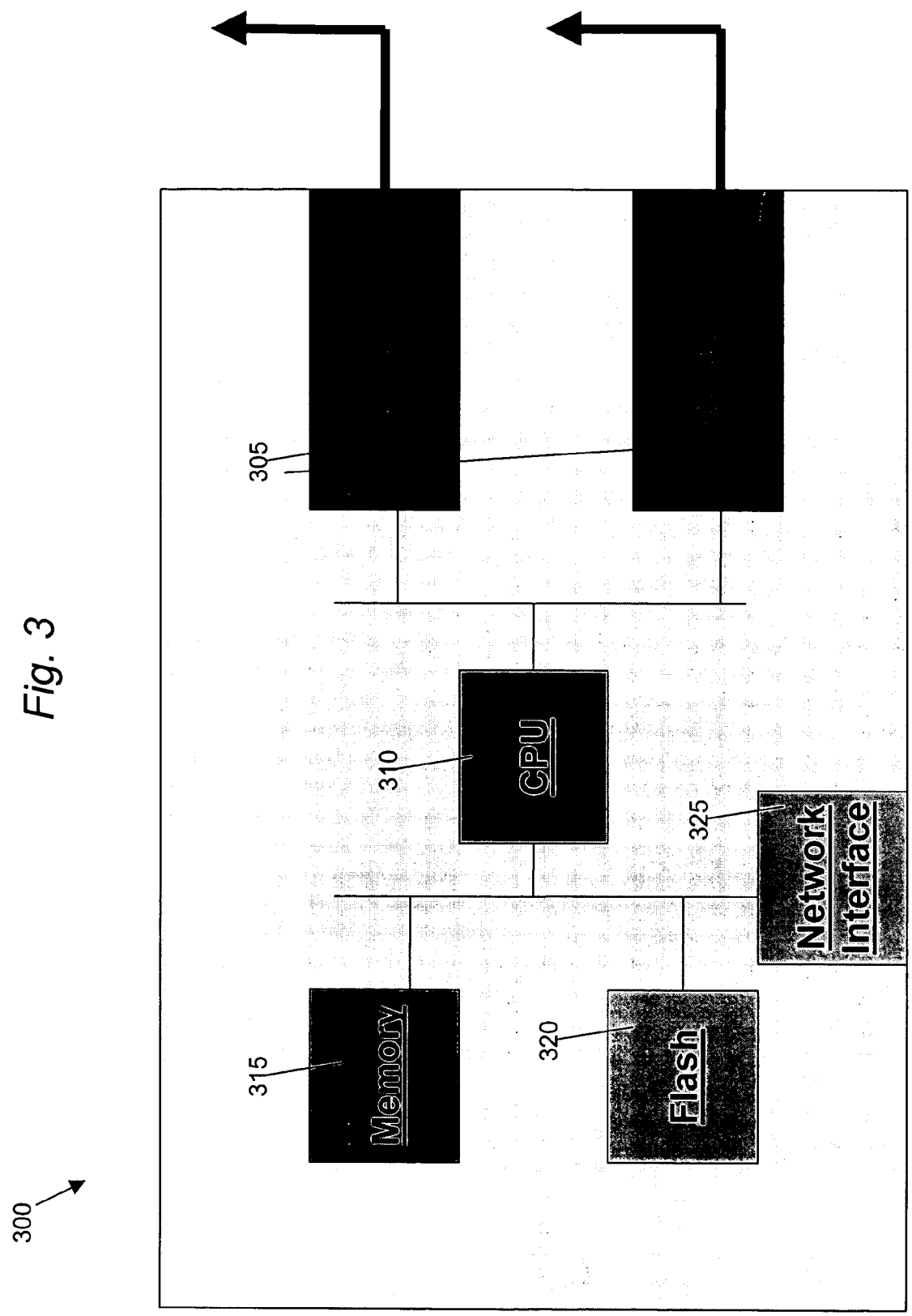
FIG. 3 is a block diagram of an exemplary RFID reader that may be configured to perform some methods of the present invention.

FIG. 3 illustrates an RFID reader that can be configured to perform methods of the present invention. RFID reader 300 includes one or more RF radios 305 for transmitting RF waves to, and receiving modulated RF waves from, RFID tags. RF radios 305 provide raw RF data that is converted by an analog-to-digital converter (not shown) and conveyed to other elements of RFID reader 300. In some embodiments, these data are stored, at least temporarily, by CPU 310 in memory 315 before being transmitted to other parts of RFID network 200 via network interface 325. Network interface 325 may be any convenient type of interface, such as an Ethernet interface.

Flash memory 320 is used to store a program (a "bootloader") for booting/initializing RFID reader 300. The bootloader, which is usually stored in a separate, partitioned area of flash memory 320, also allows RFID reader 300 to recover from a power loss, etc. In some embodiments of the invention, flash memory 320 includes instructions for controlling CPU 310 to form "DHCPDISCOVER" requests, as described below with reference to FIG. 6, to initiate a provisioning/configuration cycle. In some implementations, flash memory 320 is used to store personality information and other configuration information obtained from, e.g., a DHCP server during such a cycle.

However, in preferred implementations, such information is only stored in volatile memory 415 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 315. Updates may be instigated by the central server or selected, trusted devices. New versions of the image file (e.g., the running, base image necessary to operate the RFID device) are copied into flash memory 320. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 4:
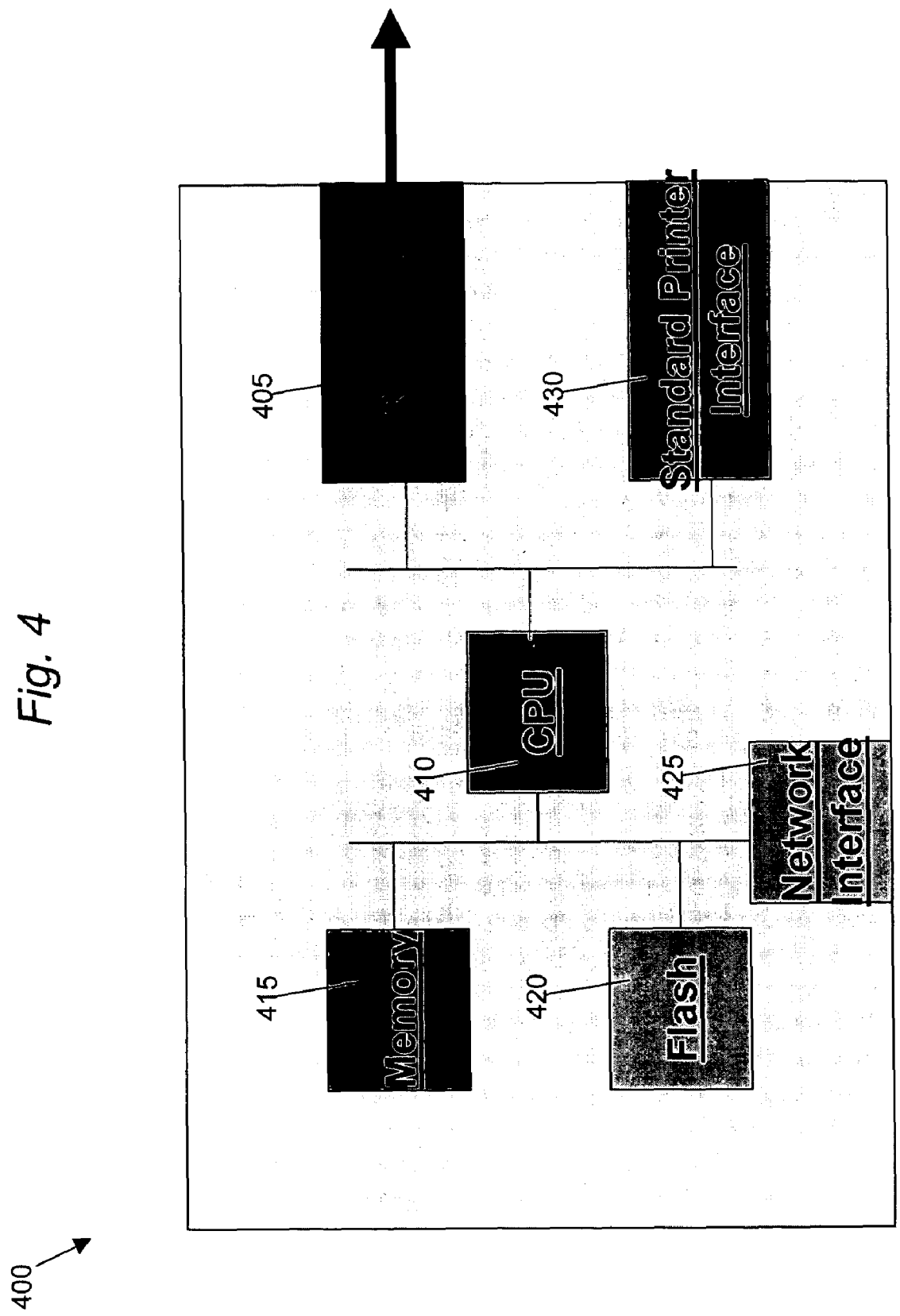
FIG. 4 is a block diagram of an exemplary RFID printer that may be configured to perform some methods of the present invention.

FIG. 4 is a block diagram illustrating an exemplary RFID printer 400 that may be configured to perform some methods of the present invention. RFID printer 400 has many of the same components as RFID reader 300 and can be configured in the same general manner as RFID reader 300.

RFID printer also includes printer interface 430, which may be a standard printer interface. Printer interface prints a label for each RFID tag, e.g. according to instructions received from network 200 via network interface 425.

RF Radio 405 is an outbound radio that is used to send RF signals to the antenna of an RFID tag under the control of CPU 410, thereby encoding information (e.g. an EPC) on the tag's microprocessor. Preferably, RF Radio 405 then checks the encoded information for accuracy. The RFID tag is sandwiched within the label produced by printer interface 430.

Figure 5:
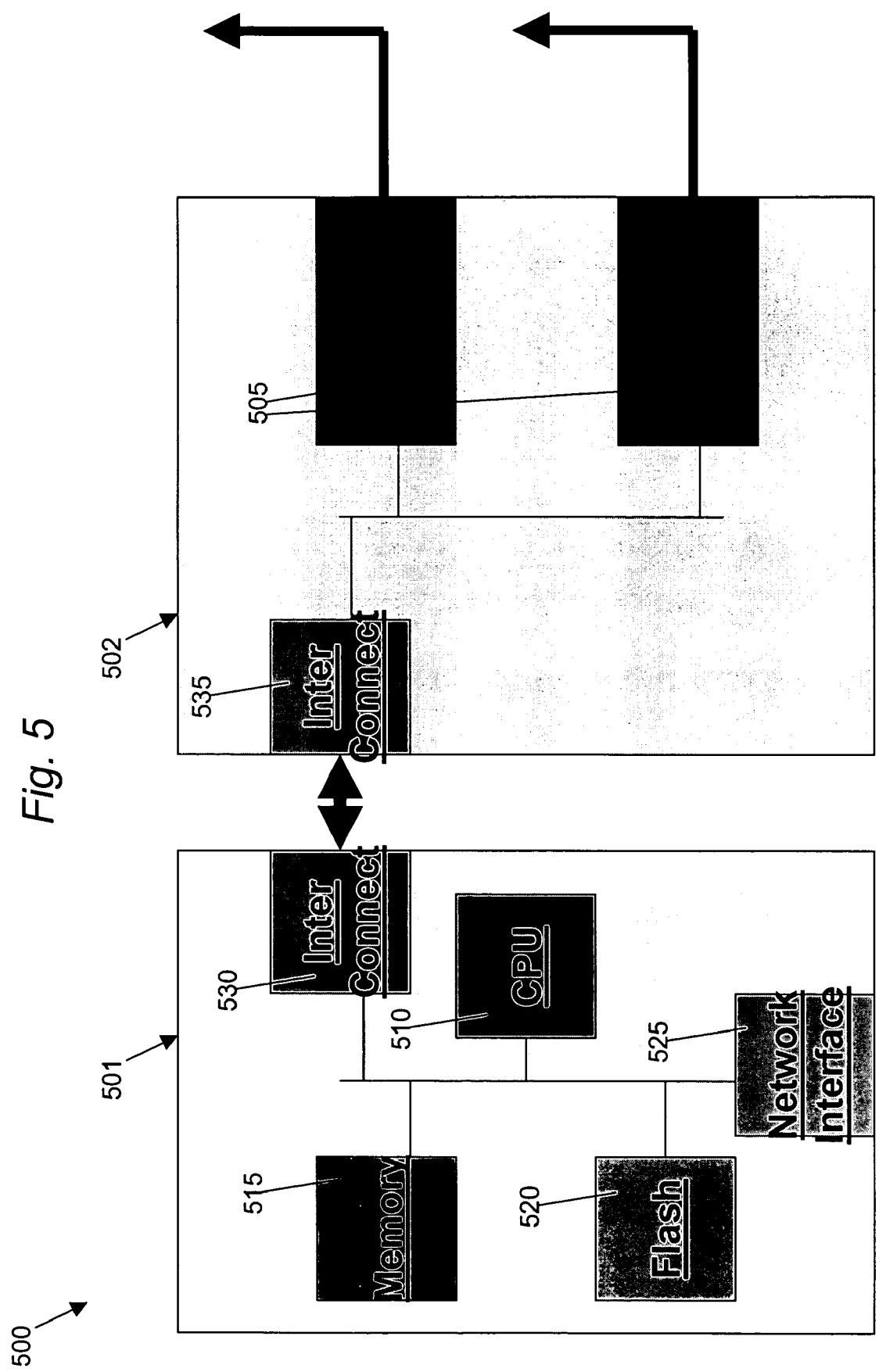
FIG. 5 is a block diagram of an exemplary RFID system that may be configured to perform some methods of the present invention.

FIG. 5 illustrates RFID system 500 that includes control portion 501 and RF radio portion 502. The components of control portion 501 are substantially similar to those described above with reference to FIGS. 3 and 4. Interconnect 530 of control portion 501 is configured for communication with interconnect 535 of RF radio portion 502. The communication may be via any convenient medium and format, such as wireless, serial, point-to-point serial, etc. Although only one RF radio portion 502 is depicted in FIG. 5, each control portion 501 may control a plurality of RF radio portions 502. RFID system 500 may be deployed on a single framework or chassis (e.g., on a forklift) or in multiple chassis.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes.

In some preferred implementations, an EPC corresponding to an RFID device is put inside a DHCP request sent from the RFID device to a DHCP server. The EPC uniquely identifies the RFID device. Some implementations employ Domain Name Service ("DNS") and dynamic DNS ("DDNS") to allow yet easier identification of RFID devices.

Figure 6:
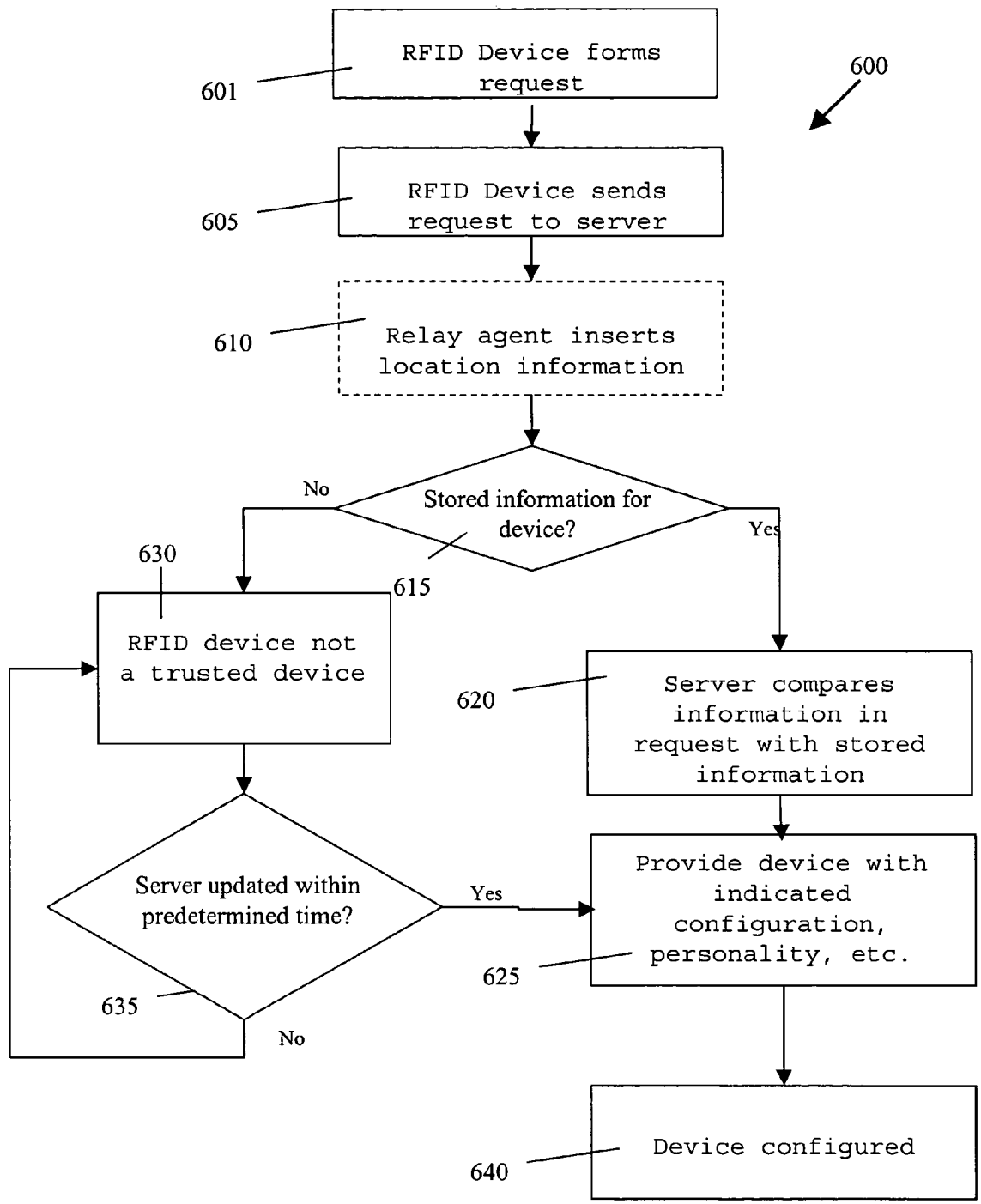
FIG. 6 is a flow chart that provides an overview of some methods of the present invention.

An overview of some such implementations of the present invention will now be described with reference to FIG. 6. A device that sends out an initiation for an IP address to a DHCP server does so by way of a packet that includes a "DHCPDISCOVER" request. This command includes the media access control ("MAC") address of the device. According to some preferred implementations, the RFID device (e.g., CPU 310 of RFID Reader 300) forms a "DHCPDISCOVER" request packet that includes information in various DHCP Option fields (step 601). The RFID device encodes DHCP "class identifier" Option 60 with a code indicating that the device is an RFID device. In other words, "RFID" will be a new type of "class," encoded in Option 60.

In this example, the RFID device encodes its own EPC in the field reserved for Option 61. The RFID device also encodes a company name, e.g., of the company that supplies, owns or is using the RFID device, in DHCP Option 43.

Option 77 may be used in various ways according to different implementations of the invention. In some implementations, Option 77 will be used to indicate the type of RFID device, e.g., that the RFID device is an RFID reader or an RFID printer. In some implementations, Option 77 can also include information regarding the functionality or "personality" of the RFID device. For example, Option 77 could indicate that the RFID device is an inbound RFID reader, an outbound RFID reader, an RFID reader or printer on an assembly line, a retail store, etc.

Referring once again to FIG. 2, if the request is from RFID device 252, that device would encode information in Option 77 indicating that the device is an RFID reader. In some implementations, Option 77 also indicates that RFID device 252 has a personality suitable for being positioned at an entrance door. Some implementations include more detailed information about the current personality of device 252. For example, Option 77 may indicate that in addition to reading EPC codes and uploading them to the RFID network, device 252 will also cause a green light to flash if an authorized person or object enters door 225 and will cause a red light to flash, an alarm to sound and an alert to be sent to an administrator on the network if a product exits door 225. This information could be encoded, for example, according to a number that corresponds to one of a range of suitable personalities for an RFID reader at an entrance door.

It is desirable to determine and provide location information for RFID devices in a network. Switches and wireless bridges with Ethernet or switch ports are considered static and have assigned names and locations. According to some implementations of the invention, location information is added, for example to an RFID device's DHCPDISCOVER request, by the network device to which the RFID device is attached (step 610).

Some such implementations use DHCP Option 82 (RFC 3046) in a new way to determine the switch port and switch to which an RFID device is connected. For example, a switch may insert the following two information elements into any DHCP request from an attached RFID device: Option 82, Sub-Option 1: Agent Circuit ID and Option 82, Sub-Option 2: Agent Remote ID. The Agent Circuit ID is the name or identifier of the switch. The Agent Remote ID is the name or identifier of the switch port.

For example, if the request is from RFID device 226 of FIG. 2, network device 230 adds location information to the request in step 610. Here, the location information would be encoded in Option 82 and would include information identifying network device 230 and port 216, to which RFID reader 226 is attached.

In alternative embodiments wherein the RFID device is capable of determining its own location (e.g., from GPS coordinates), the RFID device may encode location information in the DHCPDISCOVER request or in other commands.

There can be multiple DHCP servers serving the same network. How the servers respond can depend, for example, on whether each server is busy, whether it has served out all its addresses, etc. As RFID pilot networks emerge and develop, they will be interleaved with existing networks, including networks that employ the DHCP protocol. DHCP servers that are provisioning RFID devices (e.g. server 270 of FIG. 2) will respond to "DHCPDISCOVER" commands identifying a class of the device as "RFID," e.g., encoded in Option 60. Those of skill in the art will appreciate that other Options may be used for this purpose. Conversely, DHCP servers that are not provisioning RFID devices will not respond to "DHCPDISCOVER" commands identifying a class of the device as "RFID." Further, if a non-RFID DHCP server does respond, the RFID device will be able to determine from the DHCP options response that it has received an incomplete DHCP response and will discard it and will prefer responses from RFID DHCP servers. Accordingly, the methods of the present invention allow for the integration of RFID networks within the existing framework of the DHCP protocol.

In step 615, the DHCP server determines whether there is information regarding the requesting device within a database of information regarding known RFID devices, their intended functions, configurations, etc. For example, the BHCP server may inspect the EPC encoded in a request and determine whether there is information for a device with a corresponding EPC in the database.

If so, in step 620, the server compares information in the DHCP request with stored information regarding the RFID device. This information may be in a database (e.g., stored in one of storage devices 265) that is updated, for example, by IT personnel responsible for the RFID network. For example, MAC address information and EPC information can be combined to identify a particular device and its location in a network. Upper-level applications can be notified, for example, that a particular RFID device is available for use.

By inspecting the received data, the server can then determine the type, identity, location and personality (if any) of the RFID device. By comparing the received data with information in the database, the server can then determine, for example, if that precise RFID device has moved and where it is now located. In preferred implementations, the DHCP server may determine the current personality of the RFID device (e.g., by inspecting the Option 77 data) and may compare the current personality with a desired personality.

In step 625, the DHCP server provides the RFID device with configuration information, etc., indicated in the database. For example, the DHCP server may indicate the RFID device's time server, SYSLOG server, the location of the device's configuration files, image files, etc. If the RFID device's current personality does not match the desired personality (or if the request does not indicate a current personality), according to some implementations the DHCP server can provide the device with information (e.g., a computer program, configuration settings, etc.) for enabling the desired personality.

For example, suppose that the EPC code indicates that the device is RFID reader 252 and Option 77 indicates that RFID device 252 has a personality suitable for being positioned at an entrance door. However, the location information in the request may indicate that the requesting device has been moved and is now located at an exit door. Alternatively, the database may indicate that the device is positioned at a door that has been used as an entrance door, but which now will be used as an exit door. This may be a periodic (e.g. hourly, daily, weekly, or monthly) change at a manufacturing facility or warehouse, or may be due to a reconfiguration of the facility.

Therefore, the desired personality for RFID device 252 is now a personality appropriate for an exit door. However, there may be a range of different "exit door" personalities that could be provided to device 252 depending, for example, on the capabilities of the device making the request, the expected uses of the exit door, etc. For example, a device with fewer capabilities (e.g., a smaller memory) may be enabled for relatively simpler exit door functionality. For example, such a device may be enabled to, e.g., make a green light flash when particular type of product is exiting the door and to transmit a notification message to IT personnel and/or cause an alarm to sound if other items are exiting the door.

However, a device with greater capabilities may be enabled for relatively more complex exit door functionality. For example, the device could be enabled to cause a green light to flash if a particular type of product is exiting at an expected time, if the number of products exiting the door is within a predetermined range, etc.

This flexibility in reassigning device personality allows an RFID network to cause the same device type to have multiple personalities based upon location, time of day, or any other suitable criteria. Moreover, this flexibility allows for movement or relocation of devices (whether or not this movement has been approved in advance) and then having devices automatically "repersonalized," as appropriate for the new location. In addition, it allows for specialized functionality on a per device, per locale basis.

However, in some circumstances there may be no information in the database regarding the device. For example, the device may be a new RFID device that has just been activated in the RFID network for the first time (step 630). In this example, the device is placed in a "walled garden" for devices that are not trusted devices. Step 630 may involve assigning the device a non-routable IP address for a predetermined length of time via a DHCPOFFER command. According to some implementations, the DHCP server performs step 630 when there is information in the database regarding the device that is inconsistent with information in the request.

Preferably, step 630 includes notifying an upper-layer application that the device has made the request. In this way, IT personnel responsible for the site within which the RFID device is located will be notified that the RFID device exists and has made a request.

According to some implementations, step 630 involves setting the DHCP T1 timer for a short time interval, for example, 60 seconds. In this example, the RFID device will continue to send DHCP requests to the server every 60 seconds and the server will send "ACKs" to the device until one of two events occurs: (1) the server has been updated (e.g., by IT personnel responsible for the site within which the RFID device is located); or (2) the connection between the server and the RFID device goes down. (Step 635.)

If the server is updated within the predetermined time, this indicates that an IT person has determined that the RFID device making the request is a trusted device. Accordingly, the method proceeds to step 625. If not, the device remains classified as an untrusted device (step 630). Preferably, the device's status may still be changed to that of a trusted (and therefore provisioned) device, e.g., according to subsequent input from IT personnel.

After an initial provisioning configuration cycle (e.g., as described above), RFID devices may need to be reprovisioned or have their personalities changed. As noted above, it is desirable for an RFID device to take on unique provisioning and personalities depending on the desired functionality of the RFID device at a particular time. The desired functionality may be determined according to the location and capabilities of the RFID device. Some devices may be provided with the same personality for a relatively longer time, e.g., months or years. However, it may be desirable to change the personality and/or provisioning information of an RFID device in a relatively shorter time, e.g., prior to the time that a DHCP T1 timer expires. The majority of currently-deployed RFID end devices do not support RFC 3203 (DHCP Reconfigure Extension).

Figure 7:
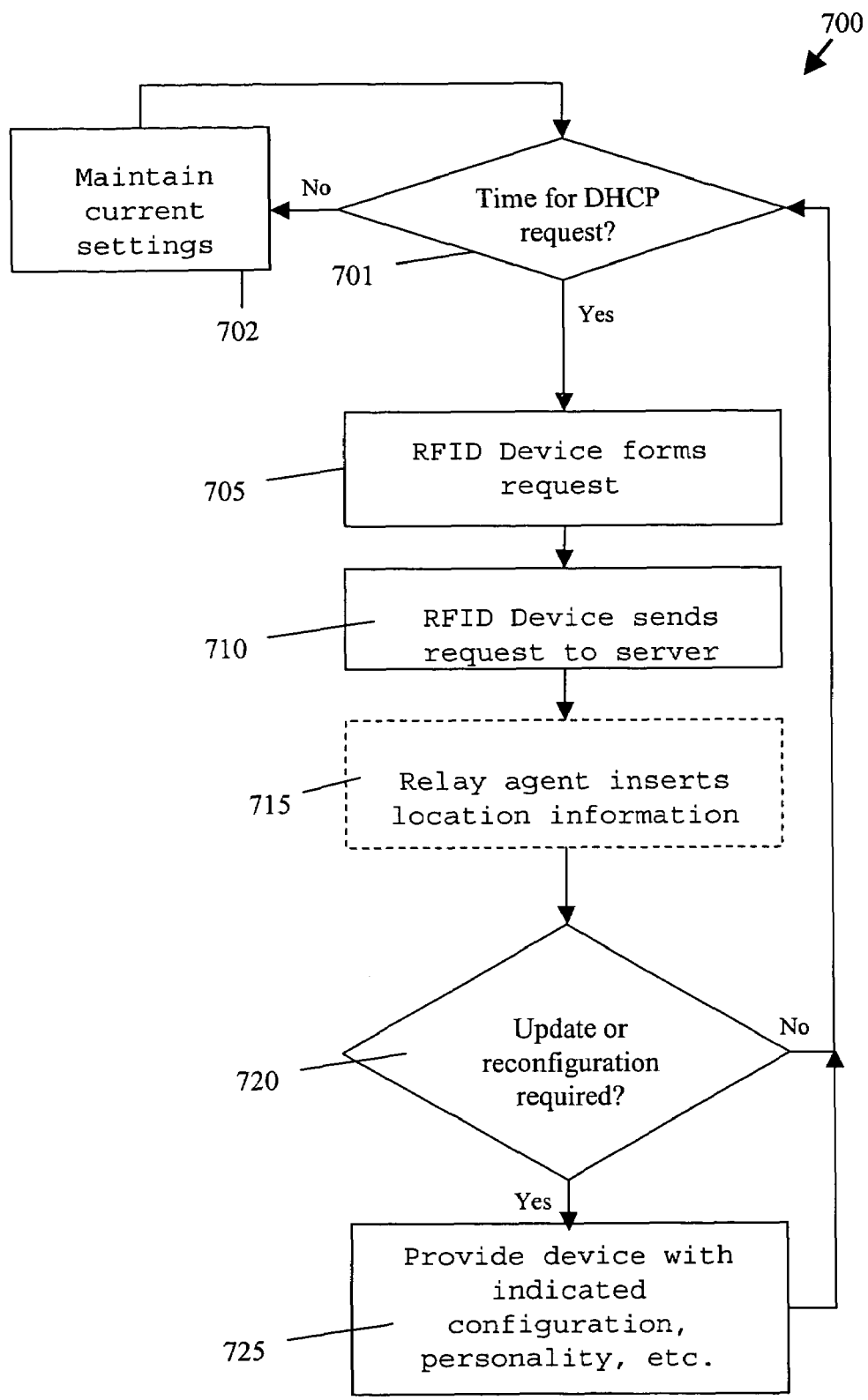
FIG. 7 is a flow chart that provides an overview of alternative methods of the present invention.

The present invention encompasses a variety of methods for accomplishing these goals. One such method will now be described with reference to FIG. 7. Method 700 begins with a determination of whether to send information to a network device regarding the current personality of the RFID device (step 701). Here, the RFID device will send the information to a DHCP server if a predetermined period of time has elapsed. In this example, the predetermined period of time is one hour, but it could be any convenient period of time.

If it is time for another DHCPREQUEST or DHCPINFORM request to be sent to the DHCP server, the RFID device forms the request (step 705). If not, the current personality is maintained (step 702). In this example, the information will be sent in a DHCP request (RFC 2131) combined with DHCP Option 61 set to the RFID device's EPC (or equivalent) and Option 77 set to the RFID device's current personality. Using DHCPINFORM and DHCP Options, the RFID device is able to pass current identification, provisioning and personality information.

In this example, a cached secret (e.g., hashed with the contents of the DHCP message, including the client EPC) will be included with the DHCP request in order to secure the response. The secret could be provided, for example, during an earlier provisioning stage, e.g., the initial provisioning stage of the RFID device. The secret could be used in the DHCPINFORM validation process and for other processes.

The request is sent in step 710. Preferably, a relay agent updates the request with location information, as described above (step 715).

In step 720, the server compares the information in the request with stored information (e.g., in a lookup table or a database) to determine whether an update or a complete reconfiguration of the RFID device is required. If not, the process returns to step 701. If so, the server provides the RFID device with the necessary update and/or reconfiguration information (step 725).

The RFID device triggers the update and/or reconfiguration determination in the foregoing example. However, in other implementations, another device (e.g., the DHCP server) and/or a person initiates this determination. For example, the DHCP server could initiate a periodic process of comparing a desired RFID device personality with the last known RFID device personality. Alternatively, an IT worker could send information (e.g., to the DHCP server, to the RFID device or to another device) indicating a desired change in personality.

According to some implementations of the invention, a DHCP server causes an update or a complete reconfiguration using a DHCPFORCERENEW command as defined by RFC 3203, which is hereby incorporated by reference in its entirety. The CPU of the RFID device registers the ForceRenew command and starts a new provisioning cycle, for example as described above with reference to FIG. 6.

In order to secure the command, in this example a cached secret is hashed within the command. For example, the secret can be included with the EPC code of the RFID device.

One method for creating an authentication key is as follows:

MD-5 (EPC, Challenge, Secret)

By adding in the variable of a random Challenge, no replay attacks of the hash code could be used. Because the EPC is included, the authentication can be further validated to come from a specific device.

The foregoing methods allow for unique determination and provisioning of RFID devices by time of day, not simply by device "type," "class" or "location." Moreover, the foregoing methods allow for ongoing verification/auditing of what the end device roles are. In addition, these methods allow operation managers to have enterprise resource planning systems control end devices to allow for increased functionality.

Figure 8:
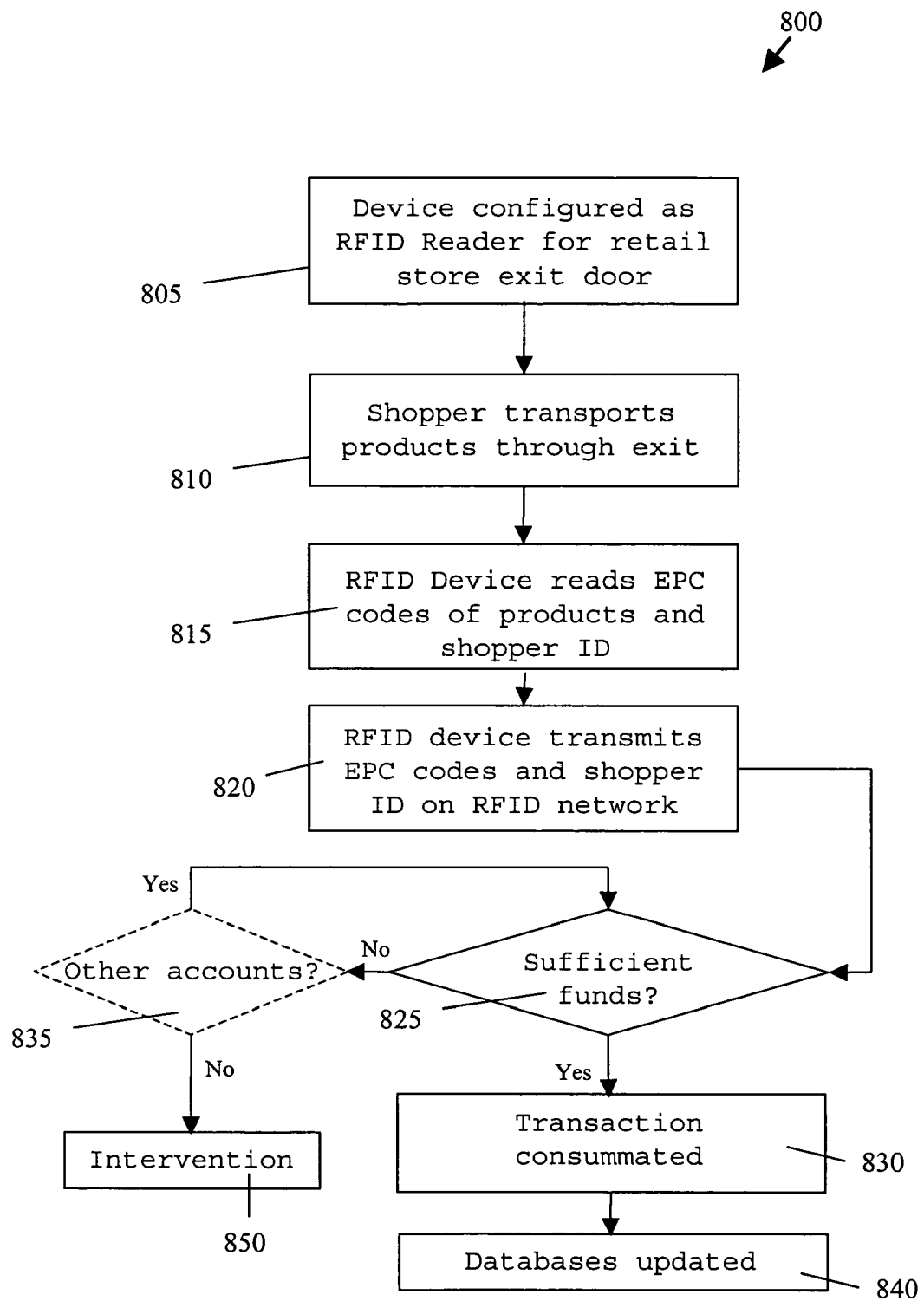
FIG. 8 is a flow chart that provides an overview of some implementations of the present invention.

FIG. 8 is a flow chart that illustrates an exemplary business application of the present invention. Those of skill in the art will appreciate that the example described below with reference to FIG. 8 is but one of many applications of the invention.

In step 805, an RFID device has already been provisioned according to one of the previously-described methods. The condition of the RFID device is comparable to that of a device at step 640 in method 600, shown in FIG. 6 and described above. In this example, the RFID device is an RFID reader that is positioned near an exit door of a retail store. Therefore, in the previous steps, the device has been provisioned with a personality that is appropriate for its role.

In step 810, a shopper exits the door with a number of selected products. In step 815, the RFID reader reads the RFID tags of each product and extracts the EPC codes and related product information (e.g., the price of each product).

The RFID reader also reads an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 820, the RFID reader transmits the product information, including the EPC codes, on the RFID network. In this example, the information is first sent to a financial institution indicated by the shopper's RFID tag.

In step 825, the financial institution that maintains the shopper's selected account determines whether there are sufficient funds (or whether there is sufficient credit) for the shopper to purchase the selected products. If so, the shopper's account is debited and the transaction is consummated (step 830).

In this example, the shopper has the option of designating one or more alternative accounts. Accordingly, if the first account has insufficient funds or credit, it is determined (e.g., by a server on the RFID network) whether there the shopper has indicated any alternative accounts for making purchases (step 835). If so, the next account is evaluated in step 825. If it is determined in step 835 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) are transmitted on the RFID network. For example, this information is preferably forwarded to one or more devices on the RFID network that are configured to update one or more databases maintained by the retail store or the manufacturers/producers, distributors, wholesalers, etc., of the purchased products (step 840). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Figure 9:
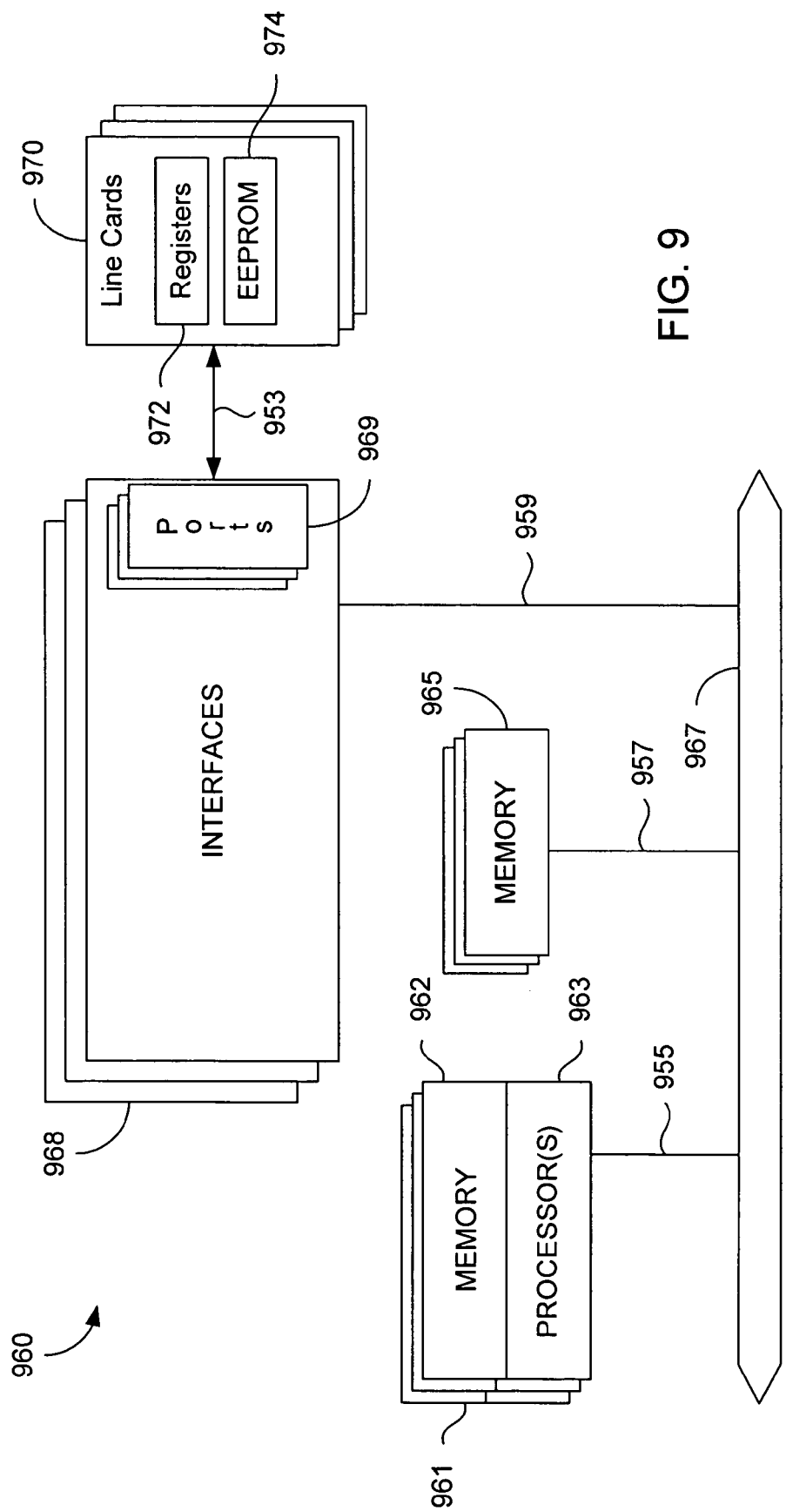
FIG. 9 illustrates an example of a network device that may be configured to implement some methods of the present invention.

FIG. 9 illustrates an example of a network device that may be configured to implement some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor 974 and, in some instances, volatile RAM. Independent processors 974 may be, for example ASICs or any other appropriate processors. According to some such embodiments, these independent processors 974 perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "line cards"). Generally, interfaces 968 control the sending and receiving of data packets over the network and sometimes support other peripherals used with the network device 960. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system (e.g. Linux, VxWorks, etc.), and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 9) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method for uniquely provisioning a radio frequency identification ("RFID") device, the method comprising:
   receiving a provisioning request on a network;
   automatically identifying an RFID device according to a media access control ("MAC") address and an electronic product code ("EPC") included in the provisioning request; and
   automatically locating the RFID device according to location information included in the provisioning request.

2. The method of claim 1, wherein the receiving, locating and identifying steps are performed by a network device.

3. The method of claim 2, wherein the network device is a Dynamic Host Configuration Protocol ("DHCP") server.

4. The method of claim 1, further comprising the step of comparing first information in the provisioning request with second information to validate the RFID device.

5. The method of claim 4, wherein the second information is stored in a database accessible to a network device and wherein the network device performs the receiving, identifying and comparing steps.

6. The method of claim 1, further comprising the step of determining whether the RFID device has previously booted.

7. The method of claim 1, further comprising the step of determining whether provisioning information has previously been established for the RFID device.

8. The method of claim 7, further comprising the step of provisioning the RFID device when it is determined that provisioning information has previously been established for the RFID device.

9. The method of claim 8, wherein the provisioning step comprises providing configuration information to the RFID device.

10. The method of claim 8, wherein the provisioning step comprises assigning a valid Internet Protocol ("IP") address to the RFID device.

11. The method of claim 7, further comprising the step of categorizing the RFID device as an untrusted device when it is determined that provisioning information has not previously been established for the RFID device.

12. The method of claim 1, further comprising the step of automatically initiating a reprovisioning cycle to provide the RFID device with a different functionality.

13. A method for uniquely provisioning a radio frequency identification ("RFID") device, the method comprising:
   forming a DHCPDISCOVER request that includes an electronic product code ("EPC") of an RFID device and location information indicating a location of the RFID device;
   sending the DHCPDISCOVER request to a Dynamic Host Configuration Protocol ("DHCP") server; and
   receiving provisioning information from the DHCP server that is specifically intended for the RFID device.

14. The method of claim 13, wherein the forming step comprises including the EPC in Option 61 of the DHCPDISCOVER request.

15. The method of claim 13, wherein the forming step comprises including information in Option 60 of the DHCPDISCOVER request that indicates that the DHCPDISCOVER request comes from an RFID device.

16. The method of claim 13, wherein the forming step comprises including information that indicates a name of a company that operates the RFID device.

17. The method of claim 13, wherein the forming step comprises including information in Option 77 of the DHCPDISCOVER request regarding the type of RFID device that formed the DHCPDISCOVER request.

18. The method of claim 13, wherein the RFID device includes the EPC in the DHCPDISCOVER request during a first part of the forming step and wherein a relay agent includes the location information in the DHCPDISCOVER request during a second part of the forming step.

19. The method of claim 13, further comprising the step of transmitting a DHCPINFORM request to the DHCP server, the DHCPINFORM request indicating a current enabled functionality of the RFID device.

20. A radio frequency identification ("RFID") network, comprising:
   means for forming a DHCPDISCOVER request that includes an electronic product code ("EPC") of an RFID device and location information indicating a location of the RFID device;

means for sending the DHCPDISCOVER request to a Dynamic Host Configuration Protocol ("DHCP") server and for receiving provisioning information from the DHCP server that is specifically tailored for the RFID device.

21. The RFID network of claim 20, wherein the forming means comprises an RFID device for including the EPC in the DHCPDISCOVER request and a relay agent for including the location information in the DHCPDISCOVER request.

22. The RFID network of claim 20, further comprising means for transmitting a DHCPINFORM request to the DHCP server, the DHCPIINFORM request indicating a current enabled functionality of the RFID device.

23. A network device, comprising:
means for receiving a provisioning request on a network; and
means for automatically identifying an RFID device according to a media access control ("MAC") address and an electronic product code ("EPC") included in the provisioning request and for locating the RFTD device according to location information included in the provisioning request.

24. The network device of claim 20, further comprising means for comparing first information in the provisioning request with second information stored in a database accessible to the network device, thereby validating the RFID device.

25. The network device of claim 24, wherein the comparing means is further configured to determine whether the RFID device has previously booted.

26. The network device of claim 24, wherein the comparing means is further configured to determine whether provisioning information has previously been established for the RFID device.

27. The network device of claim 26, further comprising means for provisioning the RFID device when it is determined that provisioning information has previously been established for the RFID device.

28. The network device of claim 26, further comprising means for categorizing the RFID device as an untrusted device when it is determined that provisioning information has not previously been established for the RFID device.

29. The network device of claim 23, further comprising means for initiating a reprovisioning cycle to provide the RFID device with a different functionality.

30. The network device of claim 29, wherein the initiating means initiates the reprovisioning cycle via a DHCP-FORCERENEW command.

31. A computer program embodied in a machine-readable medium, the computer program including instructions for controlling one or more elements of a radio frequency identification ("RFID") network to perform the following steps:
form a DHCPDISCOVER request that includes an electronic product code ("EPC") of an RFID device and location information indicating a location of the RFID device;
send the DHCPDISCOVER request to a Dynamic Host Configuration Protocol ("DHCP") server; and
receive provisioning information from the DHCP server that is specifically intended for the RFID device.

32. The computer program of claim 31, wherein the forming step comprises including the EPC in Option 61 of the DHCPDISCOVER request.

33. The computer program of claim 31, wherein the forming step comprises including information in Option 60 of the DHCPDISCOVER request that indicates that the DHCPDISCOVER request comes from an RFID device.

34. The computer program of claim 31, wherein the forming step comprises including information that indicates a name of a company that supplies the RFID device.

35. The computer program of claim 31, wherein the forming step comprises including information in Option 77 of the DHCPDISCOVER request regarding the type of RFID device that formed the DHCPDISCOVER request.

36. A computer program embodied in a machine-readable medium, the computer program including instructions for controlling a network device to perform the following steps:
receive a provisioning request on a network;
identify an RFID device according to a media access control ("MAC") address and an electronic product code ("EPC") included in the provisioning request; and
locate the RFID device according to location information included in the provisioning request.

37. The computer program of claim 36, further comprising instructions for controlling the network device to compare first information in the provisioning request with second information stored in a database accessible to the network device, thereby validating the RFID device.

38. The computer program of claim 36, further comprising instructions for controlling the network device to determine whether the RFID device has previously booted.

39. The computer program of claim 36, further comprising instructions for controlling the network device to determine whether provisioning information has previously been established for the RFID device.

40. The computer program of claim 39, further comprising instructions for controlling the network device to provision the RFID device when it is determined that provisioning information has previously been established for the RFID device.

41. The computer program of claim 39, further comprising instructions for controlling the network device to categorize the RFID device as an untrusted device when it is determined that provisioning information has not previously been established for the RFID device.

42. A method for deploying a uniquely-provisioned radio frequency identification ("RFID") device in a network, the method comprising:
forming a DHCPDISCOVER request that includes an electronic product code ("EPC") of an RFID reader and location information indicating that the RFID reader is positioned at an exit door of a retail store;
sending the DHCPDISCOVER request to a Dynamic Host Configuration Protocol ("DHCP") server;
receiving provisioning information from the DHCP server that is specifically intended for the RFID reader; and
provisioning the RFID reader according to the provisioning information, thereby enabling the RFID reader to read RFID tags passing through the exit door and to transmit RFID tag information to an RFID network.

43. The method of claim 42, further comprising the step of using the RFID tag information to automatically update a database maintained by the retail store.

44. The method of claim 42, further comprising the step of using the RFID tag information to cause a financial account to be debited for a cost of the products.

45. The method of claim 42, further comprising the step of using the RFID tag information to automatically update a database maintained by a manufacturer of at least one of the products.

46. The method of claim 42, further comprising the step of using the RFID tag information to automatically update a database maintained by a distributor of at least one of the products.

47. The method of claim 42, further comprising the step of using the RFID tag information to update a business plan.

48. The method of claim 47, wherein the business plan is a marketing plan.

49. The method of claim 47, wherein the business plan is a manufacturing plan.

50. The method of claim 47, wherein the business plan is a distribution plan.

51. The method of claim 47, wherein the business plan is a sales plan.

52. The method of claim 42, wherein the RFID tag information comprises product information.

53. The method of claim 42, wherein the RFID tag information comprises shopper information.

54. A radio frequency identification ("RFID") network, comprising:
- a plurality of RFID devices;
- a plurality of switches connecting the RFID devices to the RFID network; and
- a Dynamic Host Configuration Protocol ("DHCP") server, wherein at least some of the plurality of RFID devices comprise:
- means for forming a DHCPDISCOVER request that includes an electronic product code ("EPC") of an RFID device; and
- means for sending the DHCPDISCOVER request to the DHCP server via a switch and for receiving provisioning information from the DHCP server that is specifically tailored for the RFID device; wherein the switch comprises means for including location information in the DHCPDISCOVER request indicating a location of the RFID device; and wherein the DHCP server comprises:
- means for receiving a DHCPDISCOVER request; and
- means for automatically identifying an RFID device according to a media access control ("MAC") address and an EPC included in the DHCPDISCOVER request and for locating the RFID device according to the location information included in the DHCPDISCOVER request.

55. A method for uniquely provisioning a radio frequency identification ("RFID") reader or printer, the method comprising:
- receiving a provisioning request on a network from an RFID reader or printer;
- automatically identifying the RFTD reader or printer according to a media access control ("MAC") address and an electronic product code ("EPC") included in the provisioning request; and
- automatically locating the RFID reader or printer according to location information included in the provisioning request.

* * * * *